US007315244B2

(12) United States Patent
Carmichel

(10) Patent No.: US 7,315,244 B2

(45) Date of Patent: Jan. 1, 2008

(54) EXCESSIVE NOISE LEVEL ALERTING DEVICE

(76) Inventor: Eric L. Carmichel, 3855 Willow Creek Rd., Prescott, AZ (US) 86301

(*) Notice: Subject to any disclaimer, the term of this patent is extended or adjusted under 35 U.S.C. 154(b) by 443 days.

(21) Appl. No.: 10/890,624

(22) Filed: Jul. 14, 2004

(65) Prior Publication Data

US 2006/0012478 A1 Jan. 19, 2006

(51) Int. Cl.

*G08B 21/00* (2006.01)
*G08B 23/00* (2006.01)
*G01C 3/08* (2006.01)

(52) U.S. Cl. .................. 340/540; 340/521; 340/573.1; 73/645; 73/646

(58) Field of Classification Search .................... None
See application file for complete search history.

(56) References Cited

U.S. PATENT DOCUMENTS

| | | | | |
|---|---|---|---|---|
| 5,420,581 | A * | 5/1995 | Peters et al. | 340/573.1 |
| 5,877,684 | A * | 3/1999 | Lu | 340/521 |
| 5,999,089 | A * | 12/1999 | Carlson | 340/328 |
| 7,127,300 | B2 * | 10/2006 | Mazar et al. | 607/60 |

* cited by examiner

*Primary Examiner*—Julie Bichngoc Lieu
(74) *Attorney, Agent, or Firm*—Quarles & Brady LLP

(57) ABSTRACT

A sound-detection and alerting system (SDAS) is designed for use in hospitals, offices, or other environments where excessive noise levels are of concern. The SDAS depends on several variables to trigger an alarm so that false alarms are kept to a minimum. A microphone circuit captures acoustic energy which is limited to specific frequencies by a bandpass filter. A comparator integrates the various frequencies and compares them to a threshold signal. A delay timer ensures that signals exceeding the threshold signal are persistent for a pre-determined period of time.

18 Claims, 4 Drawing Sheets

EXCESSIVE NOISE LEVEL ALERTING DEVICE

BACKGROUND OF THE INVENTION

1. Field of the Invention

This invention is related in general to the field of acoustic detection systems. In particular, the invention consists of a device for detecting excessive noise that exceeds a threshold for a specified period of time or is repetitive.

2. Description of the Prior Art

Noise detection systems have been used in hospitals, offices, or other environments where excessive noise levels are of concern. A simple noise detection system is based on using a sound level meter or dosimeter to detect when acoustic noise exceeds a cut-off level. The force of sound striking a pressure transducer creates an electrical signal whose amplitude and component frequencies are analogous to the sound's pressure variations. This electrical signal is then integrated by the dosimeter over various frequency ranges to obtain a corresponding noise level. These noise levels are then integrated to produce a signal representative of the power of the sound striking the pressure transducer. The resulting power signal is multiplied by the period of time of the duration of the sound striking the pressure transducer to provide a signal representative of the energy contained in the sound. This energy signal, a voltage signal representative of a corresponding decibel level, is compared to a pre-determined cut-off level. If the energy signal meets or exceeds the cut-off level, an alarm may be triggered. A system such as this may be used in a hospital to alert staff that excessive noise may be bothersome or dangerous to some of the patients. The alert can be in the form of a remote speaker or visual display such as a flashing light.

The problem with dosimeters or sound level meters is that they are prone to false triggering events. For example, a bell-like sound or ding in a hospital room may be of sufficient energy to trigger an alarm notification, even if the noise is transient in nature, is required to ensure proper care, or is not likely to disturb a patient. If a traditional noise detection system is used, alerts or alarms would occur with such frequency that they would be eventually ignored by the staff or the alerting system would be disconnected.

Another problem with current sound detection devices is that they do not effectively indicate when a bothersome noise occurring below the cut-off level occurs in a repetitive manner. For example, persons talking, persons clapping their hands or common construction noises such as hammering typically include high energy impulse sound interspersed with periods of relative quiet. An integration of this noise will produce an energy level much lower than that occurring during the sound impulses. In order for current sound detection systems to detect these impulses, the sampling frequency will need to be relatively high.

Additionally, current sound detection systems utilizing dosimeters are inadequate for separating objectionable noise from non-objectionable noise. Noise emanating from air-conditioning units or HVAC ducts is typically low-frequency, steady-state sound that is usually not considered objectionable. However, the double integration of signals coming from pressure transducers does not, by itself, separate high-frequency noise from low-frequency noise. Additionally, some types of noise are unavoidable and triggering an alert when they happen may be counter-productive, such as a single transient event (e.g., dropping a tray) or the sound created by ventilators in a patient's room.

Accordingly, it would be advantageous to have a system that detects high-energy repetitive noise and moderate energy steady-state noise. Additionally, it would be advantageous to have a system that minimizes false triggering. It would also be desirable to have a system that gives different weight to low-frequency noise than it does for high-frequency noise. Yet another desirable feature of a sound-detection system is one that can be configured to accommodate unavoidable noises.

SUMMARY OF THE INVENTION

The invention disclosed herein is a sound-detection and alerting system (SDAS) designed for use in hospitals, offices, or other environments where excessive noise levels are of concern. The SDAS depends on several variables to trigger an alarm so that false alarms are kept to a minimum. Some examples of avoidable false alarm triggers are notification bells on hospital equipment and non-preventable noises such as produced by HVAC equipment.

The SDAS is designed to detect and report objectionable noises such as persons talking in the vicinity of the device and repetitive transient events such as repeated clapping of hands or hammering. Remote sensors are used with the SDAS system and placed away from sources of non-avoidable noises such as those produced by hospital ventilators. The primary intent of the SDAS is to provide an audio or visual notification in response to bothersome and preventable noises.

The SDAS includes a preamplifier for amplify input from a microphone, a bandpass filter, a comparator, a rectifier, a smoothing filter, a delay timer, and a one-shot timer. The bandpass filter selects what frequencies of noise of are of concern and rejects frequencies that are deemed unobjectionable. The comparator, rectifier and smoothing filter evaluate the noise and trigger a notification device when a trigger condition is present for a period of time longer than that established by the delay timer. The one-shot timer provides hysteresis to the system, preventing the system from rapidly cycling alert notifications on and off.

Various other purposes and advantages of the invention will become clear from its description in the specification that follows and from the novel features particularly pointed out in the appended claims. Therefore, to the accomplishment of the objectives described above, this invention comprises the features hereinafter illustrated in the drawings, fully described in the detailed description of the preferred embodiments and particularly pointed out in the claims. However, such drawings and description disclose just a few of the various ways in which the invention may be practiced.

DESCRIPTION OF THE PREFERRED EMBODIMENTS

Figure 1:
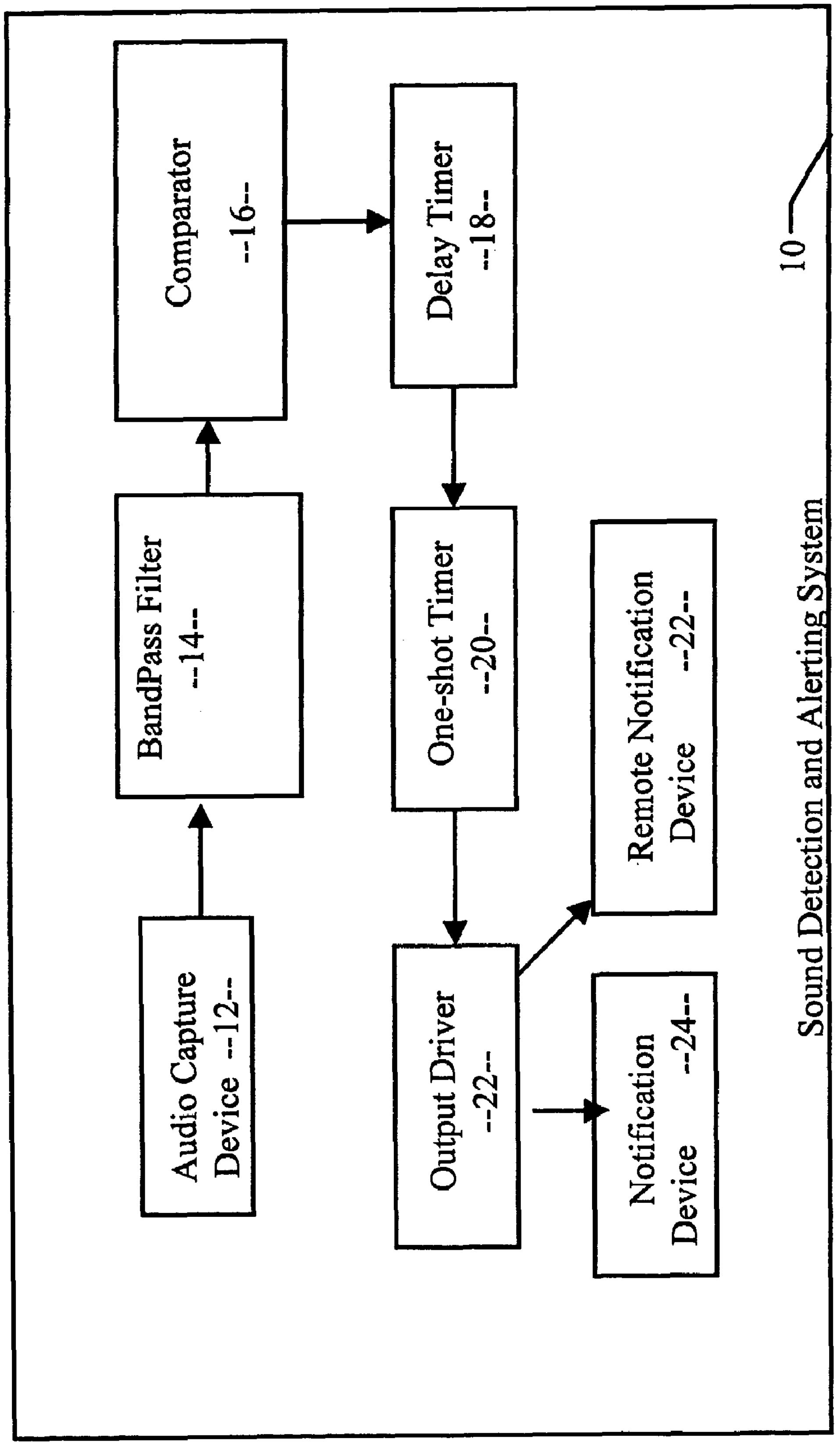
FIG. 1 is a block diagram of a sound-detection and alerting system, according to the invention, including a microphone, a bandpass filter, a comparator, a delay timer, a one-shot timer, and an output driver.

This invention is based on the idea of using a sound-detection and alarm system (SDAS) to trigger an alerting device when unwanted acoustic noise reaches an objectionable level. Referring to the figures, wherein like parts are designated with like reference numerals and symbols, FIG. 1 is a block diagram illustrating the SDAS 10 including a microphone 12, a band-pass filter 14, a comparator 16, a delay timer 18, a one-shot timer 20, and an output driver 22. The microphone converts acoustic energy into a representative electrical signal. The bandpass filter limits the frequencies of this signal to a desired range of interest. For example, a typical person may be capable of hearing sound in the range of 40 to 10,000 hertz. Sound that is outside this range is not likely to disturb a patient, is therefore irrelevant, and is filtered out. Additionally, depending on the application of the invention, certain frequencies of sound falling within the range of human hearing may be deemed either non-bothersome or unavoidable and should be discarded so as not to trigger an alarm. However, the SDAS is not limited to use in the frequency range of human hearing. Other uses of the device may require the bandpass filter to be adjusted to other frequency ranges.

Once filtered, the electric signal is passed to the comparator 16 where it is rectified, noise is removed, and the signal is evaluated to determine whether it meets triggering criteria. If so, the output from the comparator 16 triggers the delay timer 18.

The purpose of this delay timer is to require that an objectionable sound be present for a pre-determined period of time before activation a notification device. Unlike conventional timer circuits, this circuit will not trigger unless the input signal exceeds a pre-determined threshold for a pre-determined period of time. For example, a logic-high output from the comparator 16 may be high for several seconds but may correspond to sound deemed non-objectionable. Speech lasting longer than six seconds with peaks above the comparator's threshold causes the output of the delay timer 18 to go high. Once the signal from the comparator 16 goes logic-low, the output of the delay timer goes low.

It is significant to note that the current invention does not use an integrator in the delay timer. The pre-determined period of time is fixed, regardless of the intensity of the sound captured by the microphone. This is a significant departure from the prior art, as current designs utilize an integrating function resulting in relatively loud noises requiring relatively less time to trigger the delay timer. Because the SDAS uses a fixed delay period that is independent of the sound intensity, the device is resistant to triggering in response to loud but transient events. This reduces the number of false alarms generated by the device.

The one-shot timer 20 provides a persistence of alarm notification after the offending noise has ceased. As an example, noise occurring in a patient's room lasting longer than the pre-determined period of time will trigger the delay timer. Once the offending noise ceases, the delay timer is de-activated. If the notification device is turned off before anyone notices, then no corrective action may be taken to prevent the noise from re-occurring. In order to solve this problem, the one-shot timer 18 maintains an output alarm signal for a second pre-determined period of time after the delay timer deactivates. This allows the resulting alarm to be observable for longer periods of time, increasing the likelihood that the source of the offending noise will be addressed. The output driver 22 is simply a circuit used to activate the notification device 24. The notification device may be any manner of device intended to provide notification to observers such as an illuminated sign, a buzzer, or a flashing light. Additionally, the notification device may trigger a remote notification device such as a fax machine or pager for alerting personnel that are off-premises.

Figure 2:
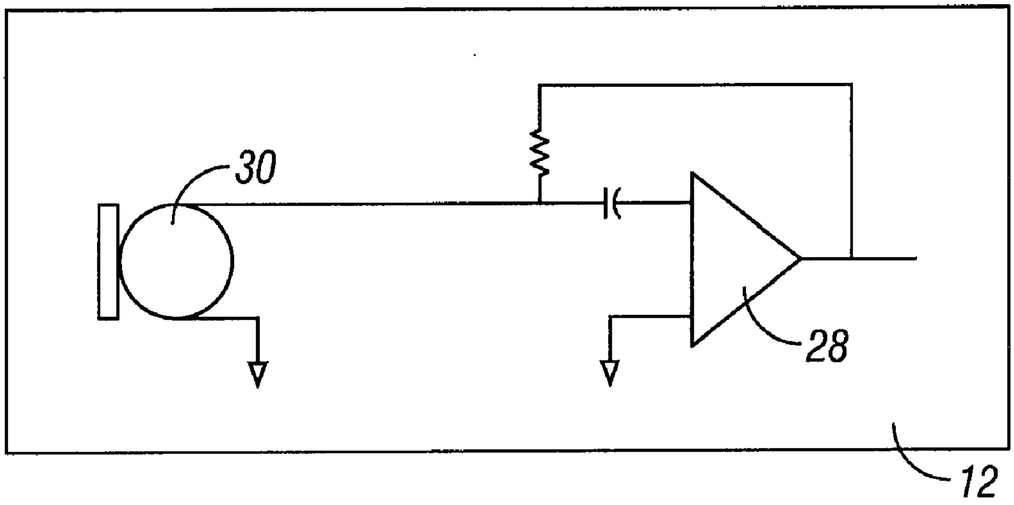
FIG. 2 is a schematic diagram of an embodiment of the microphone of FIG. 1 with a pre-amplifier.

FIG. 2 is a schematic diagram of the microphone circuit 12. A microphone pre-amplifier 28 accepts input from a pressure transducer 30, increases signal stability, and amplifies the signal before passing it to the band-pass filter 14. The bandpass filter is a simple inductor-resistor-capacitor (LRC) circuit or any similar active or passive filter device intended to limit the frequency range of the signal.

Figure 3:
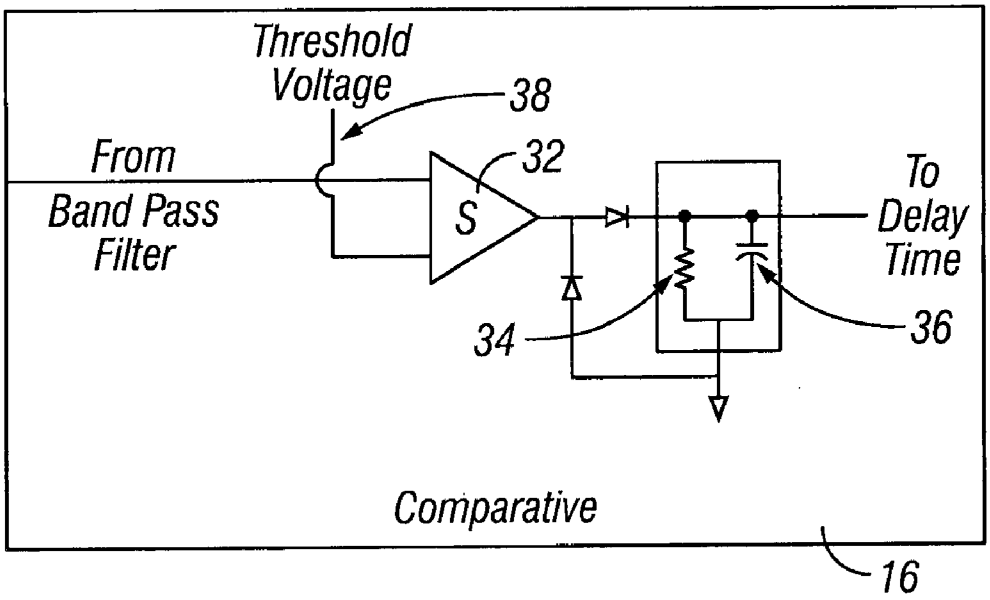
FIG. 3 is a schematic diagram of an embodiment of the comparator introduced in FIG. 1.

FIG. 3 is a schematic diagram of the comparator 16 including an integrator 32, resistor 34, and capacitor 36. The filtered electric signal is compared to a threshold signal 38 which is a direct-current signal. This threshold signal is user-adjustable and represents an intensity level. When the magnitude of the filtered signal exceeds that of the threshold signal, a rectified output signal is created. If the incoming filtered signal is alternating-current in nature, the output of the integrator is a pulsed signal. If the original electrical signal generated by the microphone circuit 12 is a representation of speech, the output of the integrator would be choppy. To reduce this effect, the resistor 34 and capacitor 36 form a smoothing filter. In this embodiment of the invention, the resistor and capacitor are selected to provide a smoothing time constant of approximately one second. Other embodiments of the comparator 16 may be used, such as basic LM311 devices and programmable comparators.

Figure 4:
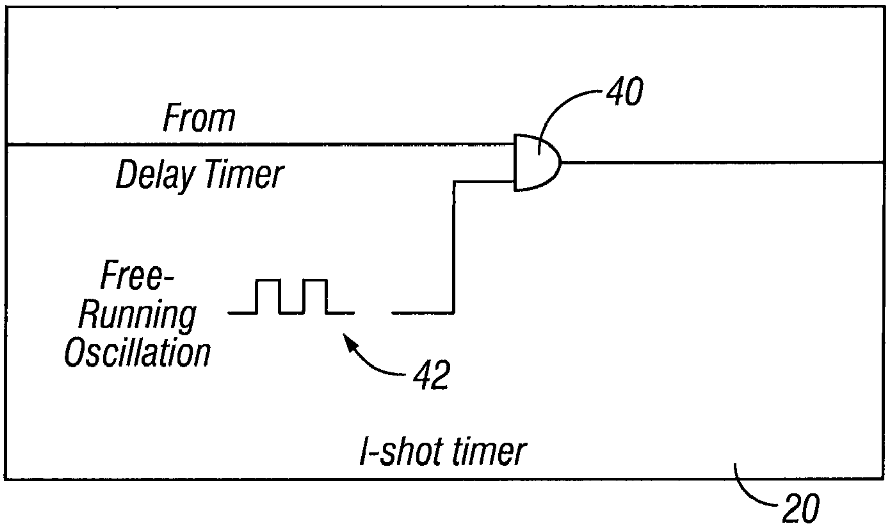
FIG. 4 is a schematic diagram of one embodiment of the one-shot timer shown in FIG. 1.
Figure 5:
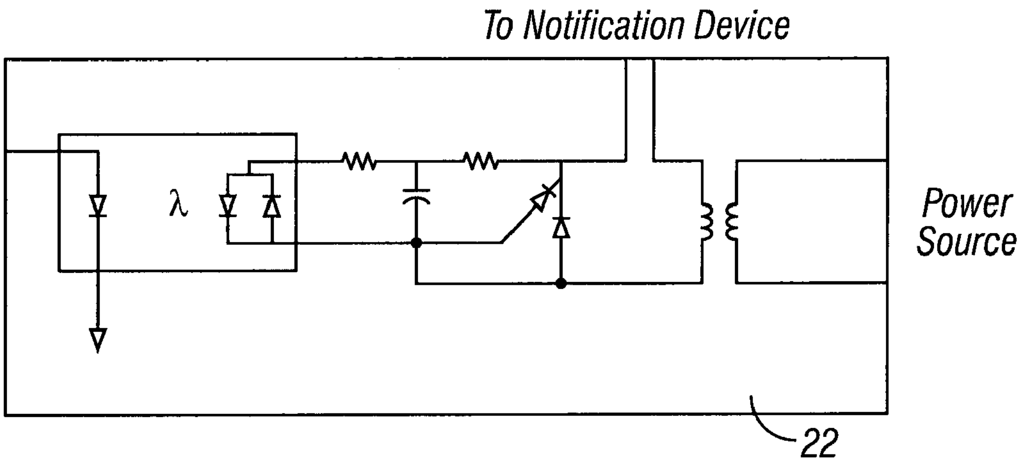
FIG. 5 is a schematic diagram of the output driver of FIG. 1.

The one-shot timer 20 is illustrated in the schematic diagram of FIG. 4. In this embodiment of the invention, an AND gate 40 has a free-running oscillating input 42 that determines the frequency that a notification device may be activated. This may be useful when the notification device 24 is a light that flashes, as a flashing light is more likely to be noticed. Output from the one-shot timer 20 is ANDed with this free-running oscillation to produce a logic-high signal that oscillates with the frequency of the free-running oscillation 42 and lasts only as long as the output from the one-shot timer is high. The use of the free-running oscillator is optional as it may not be necessary for a signal driving a notification device to oscillate. The output driver 22 is also optional, depending on the type of notification device 24. In this embodiment of the invention, the notification device is a flashing light or lighted sign. One embodiment of an output driver 22 designed to interface with a lighted sign is illustrated in the schematic diagram of FIG. 5.

Figure 6:
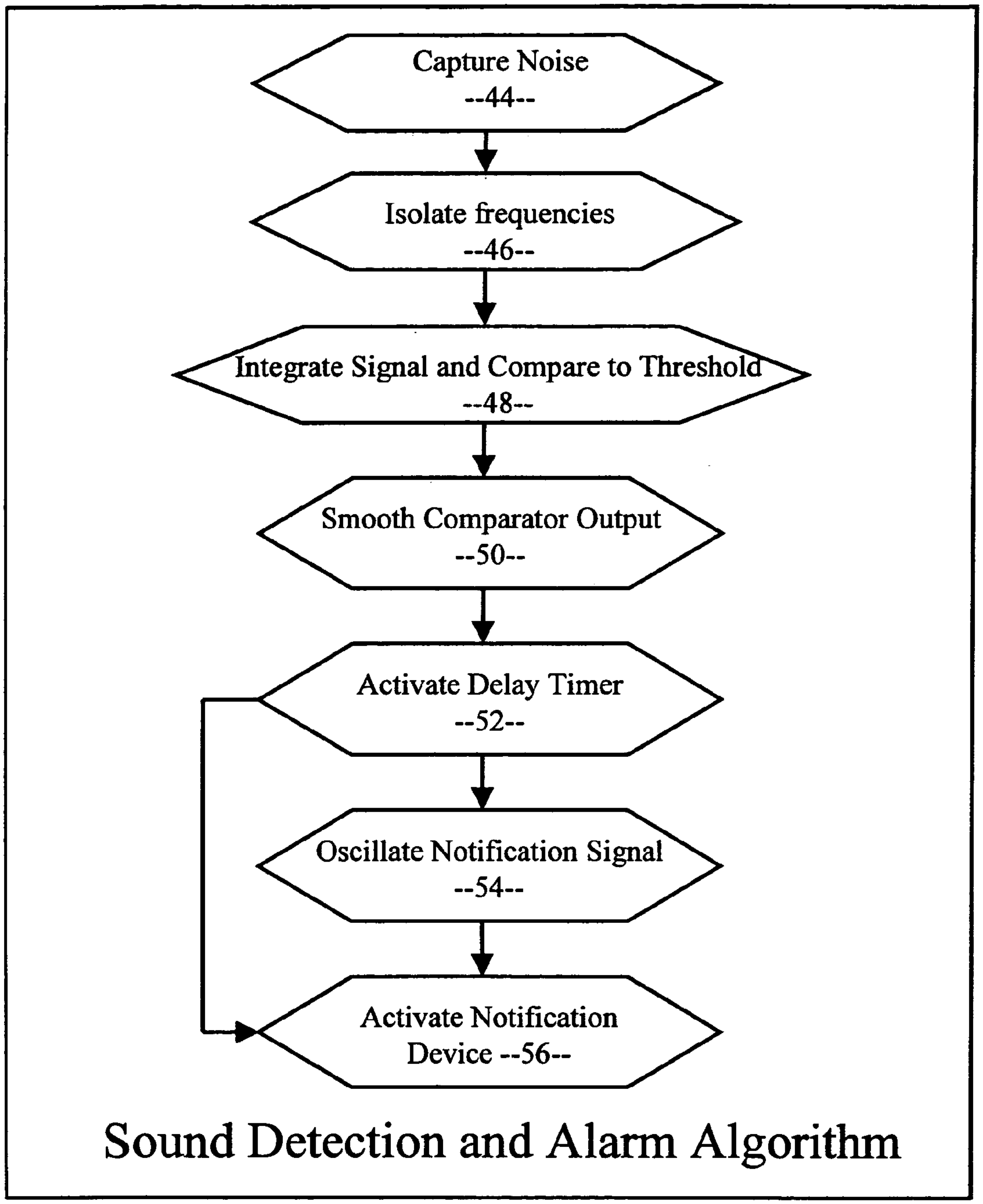
FIG. 6 is a flow-chart illustrating the process of capturing acoustic energy, converting the captured energy into an electrical signal, filtering the electrical signal, comparing a level of the electrical signal to determine if a minimum threshold is met, measuring the period of time during which the signal exceeds the threshold, triggering an alarm-duration timer, triggering an alarm, and deactivating the alarm when the alarm-duration timer expires.

FIG. 6 is a flow-chart illustrating the implementation of the SDAS. In step 44, acoustic energy is captured by a microphone or other pressure transducer and converted into an electrical signal. In step 46, the electrical signal is filtered to isolate only those frequencies of interest. The filtered electrical signal is compared to a direct-current threshold signal representative of a specific level of sound intensity in step 48. Output from the comparator is smoothed to reduce choppiness in step 50.

In step 52, the smoothed output from the comparator activates a delay timer to ensure that the acoustic noise of interest lasts longer than a pre-determined period of time. If the acoustical noise does not persist for a period greater than the delay time, the timer resets itself. Any noise must persist for longer than the delay time for the device to trigger the alerting device (a function that differentiates this device from a dosimeter). For example, if the delay time is set at 5 seconds, two 4-second noise bursts separated by two or more seconds will not trigger an alarm. Because the smoothing filter has a time constant equal to one second, fives seconds or so of noise bursts separated by no greater than 1 s will trigger the alarm. The output of the delay timer is used to activate a notification device in step 56. Optional step 54 oscillates the output from the delay timer for use with flashing lights of lighted signs.

Those skilled in the art of making status information tracking systems may develop other embodiments of the present invention. For example, the comparator 16 may be a programmed digital device rather than the analog circuit illustrated. The terms and expressions which have been employed in the foregoing specification are used herein as terms of description and not of limitation, and there is no intention in the use of such terms and expressions of excluding equivalents of the features shown and described or portions thereof, it being recognized that the scope of the invention is defined and limited only by the claims which follow.

I claim:

1. A sound-detection and alerting system, comprising:
- a device for capturing acoustic energy and producing a representative electric signal;
- a filter for limiting a plurality of frequencies of the electric signal to predetermined frequency ranges;
- a comparator for comparing the representative electric signal to an established threshold signal and producing a corresponding comparator output signal;
- a smoothing rectifier for reducing oscillations in the comparator output signal and producing a smoothed output signal;
- a timer for determining whether the smoothed output signal is within a pre-determined voltage range for at least a pre-determined period of time and producing a notification-device activation signal; and
- a one-shot device for combining the notification-device activation signal with a frequency oscillator signal to produce an oscillating activation signal which activates a notification device.

2. The sound-detection and alerting system of claim 1, wherein the device for capturing acoustic energy and producing the electric signal is a microphone circuit.

3. The sound-detection and alerting system of claim 2, wherein the microphone circuit includes a pressure transducer.

4. The sound-detection and alerting system of claim 2, wherein the microphone circuit includes a pre-amplifier.

5. The sound-detection and alerting system of claim 1, wherein said notification-device activation signal activates a notification device.

6. The sound-detection and alerting system of claim 5, wherein said notification device is a remote notification device.

7. The sound-detection and alerting system of claim 6, wherein said remote notification device is a pager.

8. The sound-detection and alerting system of claim 6, wherein said remote notification device is a fax machine.

9. The sound-detection and alerting system of claim 1, wherein said notification device is a light.

10. The sound-detection and alerting system of claim 1, wherein said notification device is an illuminated sign.

11. A sound-detection and alerting system, comprising:
- a device for capturing acoustic energy and producing a representative electric signal;
- a filter for limiting a plurality of frequencies of the electric signal to predetermined frequency ranges;
- an integrator for integrating said plurality of frequencies to produce a representative sound level signal;
- a comparator for comparing the representative sound level signal to an established threshold signal and producing a corresponding comparator output signal;
- a smoothing rectifier for reducing oscillations in the comparator output signal and producing a smoothed output signal;
- a timer for determining whether the smoothed output signal is within a pre-determined voltage range for at least a pre-determined period of time and producing a notification-device activation signal; and
- a one-shot device for combining the notification-device activation signal with a frequency oscillator signal to produce an oscillating activation signal which activates a notification device.

12. The sound-detection and alerting system of claim 11, wherein said notification device is a light.

13. The sound-detection and alerting system of claim 11, wherein said notification device is an illuminated sign.

14. A method of activating a notification device, comprising the steps of:
- capturing acoustic energy and producing a representative electric signal;
- subsequently limiting a plurality of frequencies of the electric signal to predetermined frequency ranges;
- subsequently comparing the electric signal to an established threshold signal and producing a corresponding comparator output signal;
- reducing oscillations in the comparator output signal and producing a smoothed output signal;
- determining whether the smoothed output signal is within a pre-determined voltage range for at least a pre-determined period of time and producing a notification-device activation signal; and
- combining the notification-device activation signal with a frequency oscillator signal to produce an oscillating activation signal which activates a notification device.

15. The method of claim 14, further comprising the step of activating a notification device via the notification-device activation signal.

16. The method of claim 14, further comprising the step of activating a remote notification device via the notification-device activation signal or the oscillating activation signal.

17. The method of claim 14, wherein said notification device is a light.

18. The method of claim 14, wherein said notification device is an illuminated sign.

* * * * *